B. H. WHALEY.
HOG OILER.
APPLICATION FILED JAN. 10, 1918.
1,269,352.
Patented June 11, 1918.
Fig. 1.
Fig. 2.
Fig. 3.
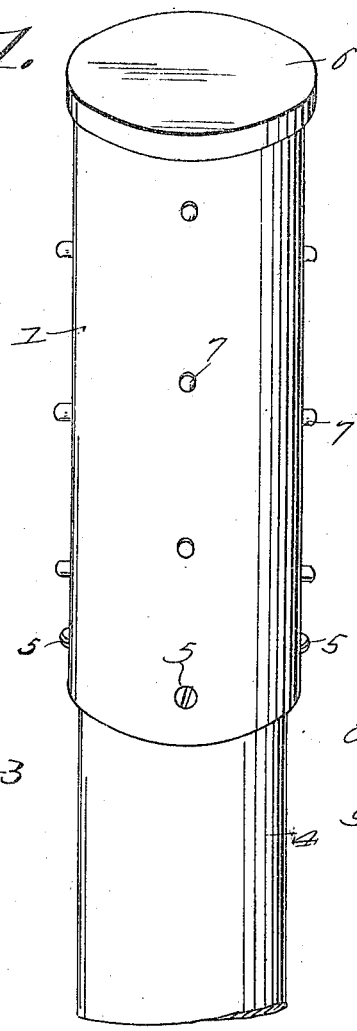
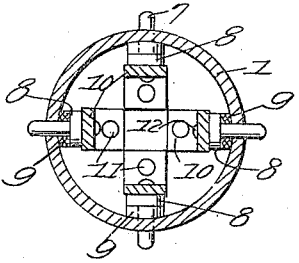
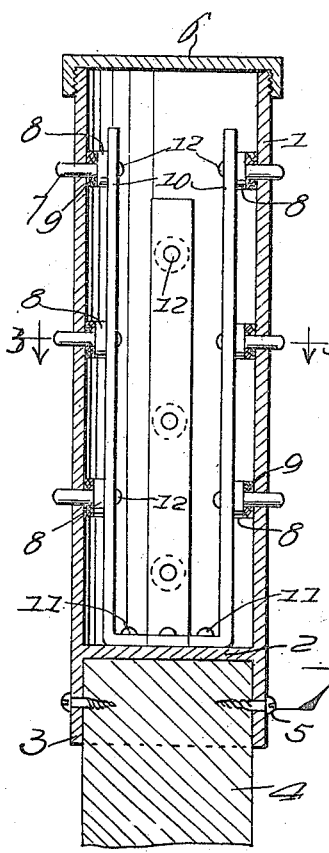
Inventor
Basil H. Whaley,
By
Attorney

UNITED STATES PATENT OFFICE.

BASIL H. WHALEY, OF BROOK, INDIANA.

HOG-OILER.

1,269,352.　　　　　Specification of Letters Patent.　　Patented June 11, 1918.

Application filed January 10, 1918. Serial No. 211,197.

*To all whom it may concern:*

Be it known that I, BASIL H. WHALEY, a citizen of the United States of America, residing at Brook, in the county of Newton and State of Indiana, have invented new and useful Improvements in Hog-Oilers, of which the following is a specification.

The invention seeks to provide, as its principal object, a rubbing post for hogs and such animals adapted to contain oil or disinfectant and having means conjoined therewith whereby, when the animal rubs or scratches against the post small quantities of oil or disinfectant will issue therefrom and be discharged over the animal's body.

Another object of the invention is to provide a device of this kind comprising a hollow cylindrical casing with a plurality of movable plugs projecting therefrom, the plugs being adapted to close holes formed in the casing which is suited for holding oil or disinfectant.

Still another object is to provide a hog oiler adapted for engagement to the upper end of wooden post.

Still another object is to provide a device of this kind which is simple in construction, which is durable and effective in operation and which is inexpensive to manufacture.

Other and further objects will appear as the device is set forth in detail in the description which follows.

To the exact construction in which it is shown and described, the invention is not to be confined. Actual practice may make manifest certain desirable changes or alterations and the right is claimed to make any which do not depart from the spirit of the appended claims.

In the accompanying drawings:

Figure 1 is a perspective view of the invention.

Fig. 2 is a longitudinal sectional view.

Fig. 3 is a transverse sectional view.

Referring to the drawings, there is shown a hollow cylindrical casing 1 in which the bottom 2 is set a specified distance above the lower end of the casing thus providing a cap member 3 at the lower end of the casing which cap member is adapted to set on the upper end of a post 4 which is suitably set in the ground.

The casing 1 is securely held on top of the post 4 by screws 5 passed radially through the cap 3 and threading into the post.

The upper end of the casing 1 is appropriately closed by a cap 6 threaded on the interior and screwing onto appropriate threads formed on the upper end of the casing 1 on the outside thereof.

The casing 1 is provided with series of holes formed in its cylindrical wall, the holes of each series being uniformly spaced longitudinally along the casing, the individual holes of each series being in staggered relation to those of the adjacent series.

Through each of these holes there is passed a stud 7 which terminates in a disk 8 carried within the casing a fiber or felt washer 9 being in surrounding relation to the stud between the inner walls of the casing and the disk 8.

Positioned in the casing and standing behind each series of holes formed therein, there is a flat spring steel member 10 whose lower end is turned at right angles to the main portion of the member, the latter being secured in place by a rivet 11 which attaches it to the bottom 2 of the casing. The studs 7 which project through each of the holes comprising the series behind which any one of the members 10 stands are, together with their disk portion 8, attached to this member by means of rivets 12.

Each of the studs 7 together with its disk portion 8 and washer 9 comprises a valve which is held normally in the position of closure for the hole through which the stud projects by means of the member 10 to which the stud is attached.

In operation, the casing 1 is filled with an oil or disinfectant after the removal of the cap 6, the latter being replaced after the filling has been accomplished. This oil or disinfectant is held within the casing because of the closed position of the valves of which the studs 7 are a part, the flat spring steel members holding the valve closed. As a hog or other animal rubs against the casing, this rubbing operates to press the studs 7 inward, thus unseating the valves against the pressure of the spring steel members 10 and allowing the contained oil or disinfectant to flow out through the holes from which the valves are unseated, this oil or disinfectant being discharged onto the animal's body.

The invention having been described, what is claimed as new and useful is:

1. In a device of the kind set forth, a cylindrical casing having means for attachment to the end of a post, a closure member for the upper end of the casing, the casing being provided with series of holes in its cylindrical wall, studs projecting through said holes, each stud terminating in a disk interior to the cylinder, washers in surrounding relation to the stud and interposed between the disks and the inner wall of the cylinder, and flat spring steel members positioned vertical in the casing and attached one to all of the studs projecting through each series of holes, whereby an animal rubbing against the latter may have oil or disinfectant discharged over its body, the casing being designed to receive such oil or disinfectant.

2. In a device of the kind set forth, a cylindrical casing having means at its lower end for attachment to the end of a post, a closure member for the upper end of the casing, the casing being provided with series of holes, each series being in the direction of the length of the cylinder and the individual holes of each series being staggered with respect to the holes of the adjacent series, valve members for closing all of the holes, and flat spring steel members secured to and closing all of the valves of each series, whereby an animal rubbing against the latter may have oil or disinfectant discharged over its body, the casing being designed to receive such oil or disinfectant.

In testimony whereof I affix my signature.

BASIL H. WHALEY.

Copies of this patent may be obtained for five cents each, by addressing the "Commissioner of Patents, Washington, D. C."